(12) United States Patent
Custer

(10) Patent No.: US 10,746,326 B2
(45) Date of Patent: Aug. 18, 2020

(54) ADDITIVELY MANUFACTURED TUBE ARRAY

(71) Applicant: General Electric Company, Schenectady, NY (US)

(72) Inventor: John Williams Custer, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 77 days.

(21) Appl. No.: 15/864,053

(22) Filed: Jan. 8, 2018

(65) Prior Publication Data

US 2019/0211949 A1 Jul. 11, 2019

(51) Int. Cl.

| *F16L 9/19* | (2006.01) |
| *B33Y 80/00* | (2015.01) |
| *B33Y 10/00* | (2015.01) |
| *B29C 65/02* | (2006.01) |
| *B29C 64/153* | (2017.01) |
| *F02C 9/18* | (2006.01) |
| *F02C 6/08* | (2006.01) |
| *B29L 23/00* | (2006.01) |
| *F02C 7/14* | (2006.01) |
| *F02C 7/18* | (2006.01) |

(52) U.S. Cl.
CPC .............. *F16L 9/19* (2013.01); *B29C 64/153* (2017.08); *B29C 65/02* (2013.01); *B33Y 10/00* (2014.12); *B33Y 80/00* (2014.12); *F02C 6/08* (2013.01); *F02C 9/18* (2013.01); *B29L 2023/00* (2013.01); *F02C 7/14* (2013.01); *F02C 7/18* (2013.01); *F05D 2220/32* (2013.01); *F05D 2230/31* (2013.01); *F05D 2230/53* (2013.01); *F05D 2260/213* (2013.01)

(58) Field of Classification Search
CPC .. F16L 9/18–20; H02G 3/0481; H02G 3/0487
USPC .................................... 138/115–117, DIG. 11
See application file for complete search history.

(56) References Cited

U.S. PATENT DOCUMENTS

| 417,992 | A | * | 12/1889 | Dell |
| 3,502,596 | A | | 3/1970 | Sowards |
| 3,582,301 | A | | 6/1971 | Andrysiak et al. |
| 3,923,940 | A | | 12/1975 | Hujii et al. |
| 4,729,409 | A | * | 3/1988 | Paul ..................... H02G 3/0487 138/115 |
| 4,975,055 | A | * | 12/1990 | LaPlante ................... F16L 9/19 138/111 |
| 5,458,711 | A | | 10/1995 | Yang |
| 6,564,831 | B1 | * | 5/2003 | Sanoner ..................... F16L 9/19 138/115 |
| 7,841,368 | B2 | * | 11/2010 | McMasters ............. B23P 6/007 138/115 |

(Continued)

*Primary Examiner* — Patrick F Brinson
(74) *Attorney, Agent, or Firm* — Dority & Manning, P.A.

(57) ABSTRACT

A tube array and a method for additively manufacturing the tube array are provided. The tube array includes an outer wall formed by a plurality of curved segments and defining a primary flow passage. A plurality of divider walls are positioned within the primary flow passage to divide the primary flow passage into a plurality of tubes, each of the plurality of tubes being defined at least in part by one of the plurality of curved segments and two of the plurality of divider walls. Integrally formed inlet and outlet manifolds provide fluid communication between the tube array and an array inlet and outlet.

18 Claims, 6 Drawing Sheets

(56) References Cited

U.S. PATENT DOCUMENTS

| | | | |
|---|---|---|---|
| 8,210,211 B2* | 7/2012 | McMasters | B23P 6/007 |
| | | | 138/115 |
| 9,134,072 B2 | 9/2015 | Roisin et al. | |
| 9,200,855 B2 | 12/2015 | Kington et al. | |
| 2002/0152715 A1* | 10/2002 | Rotheroe | E04C 3/32 |
| | | | 52/855 |
| 2015/0336094 A1 | 11/2015 | Waller et al. | |
| 2016/0091265 A1 | 3/2016 | Aramaki | |
| 2016/0333790 A1* | 11/2016 | Kironn | F02C 7/27 |

* cited by examiner

US 10,746,326 B2

ADDITIVELY MANUFACTURED TUBE ARRAY

FEDERAL RESEARCH STATEMENT

This invention was made with Government support under Contract No. FA8626-16-C-2138, awarded by the U.S. Department of Defense. The Government has certain rights in the invention.

FIELD

The present subject matter relates generally to fluid conduits or tube arrays, and more particularly, to additively manufactured tube arrays with improved flow passageways, external profiles, and structural rigidity.

BACKGROUND

Fluid conduits, tubes, or piping may be used for transporting fluids between locations within a machine or system of components for a variety of purposes. For example, fluid conduits may be used in a gas turbine engine for circulating oil between a gearbox and a heat exchanger to cool the oil, for providing a flow of cooling air to a heat sensitive area within the core engine, or for transporting fuel from a fuel storage reservoir to the combustion section of the engine for supporting engine operation.

Notably, however, space limitations or restrictions within a gas turbine engine (or other machinery) often make plumbing or routing these fluid conduits through the engine difficult. For example, fluid conduits must frequently bend around other components and fit within or pass through tight passageways within the engine. Oftentimes, fluid conduits have circular cross sections to support the stresses associated with transporting fluids, e.g., particularly high pressure fluids. However, circular conduits are often too large to fit within certain locations and accommodate the desired fluid flow rate. Although multiple smaller conduits may be used to pass the same amount of fluid while fitting within the desired areas, the manufacturing and assembly of multiple small conduits is typically expensive and inefficient. For example, each of the smaller fluid conduits must be individually positioned, oriented, and connected to a supporting structure, e.g., via brazing, welding, or another joining method. The manufacturing time and costs associated with the assembly of such a system of fluid conduits is very high and the likelihood of fluid leaks between the fluid passageways or from the fluid conduits in general is increased due to the number of junctions formed. In addition, manufacturing restrictions limit the ability to form structural features within the fluid conduits that might serve to improve fluid flow efficiency or other characteristics.

Accordingly, an improved fluid conduit or tube array for transporting fluids within a gas turbine engine or other machinery would be useful. More specifically, a tube array that is easier to manufacture, may fit within tight spaces in the engine, and includes features for improved fluid flow characteristics would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, an additively manufactured tube array is provided including an outer wall defining a primary flow passage, the outer wall formed by a plurality of curved segments. A plurality of divider walls are positioned within the primary flow passage to divide the primary flow passage into a plurality of tubes, each of the plurality of tubes being defined at least in part by one of the plurality of curved segments and two of the plurality of divider walls.

In another exemplary aspect of the present disclosure, a method of manufacturing a tube array is provided. The method includes depositing a layer of additive material on a bed of an additive manufacturing machine and selectively directing energy from an energy source onto the layer of additive material to fuse a portion of the additive material and form the tube array. The tube array includes an outer wall defining a primary flow passage, the outer wall formed by a plurality of curved segments. A plurality of divider walls are positioned within the primary flow passage to divide the primary flow passage into a plurality of tubes, each of the plurality of tubes being defined at least in part by one of the plurality of curved segments and two of the plurality of divider walls.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
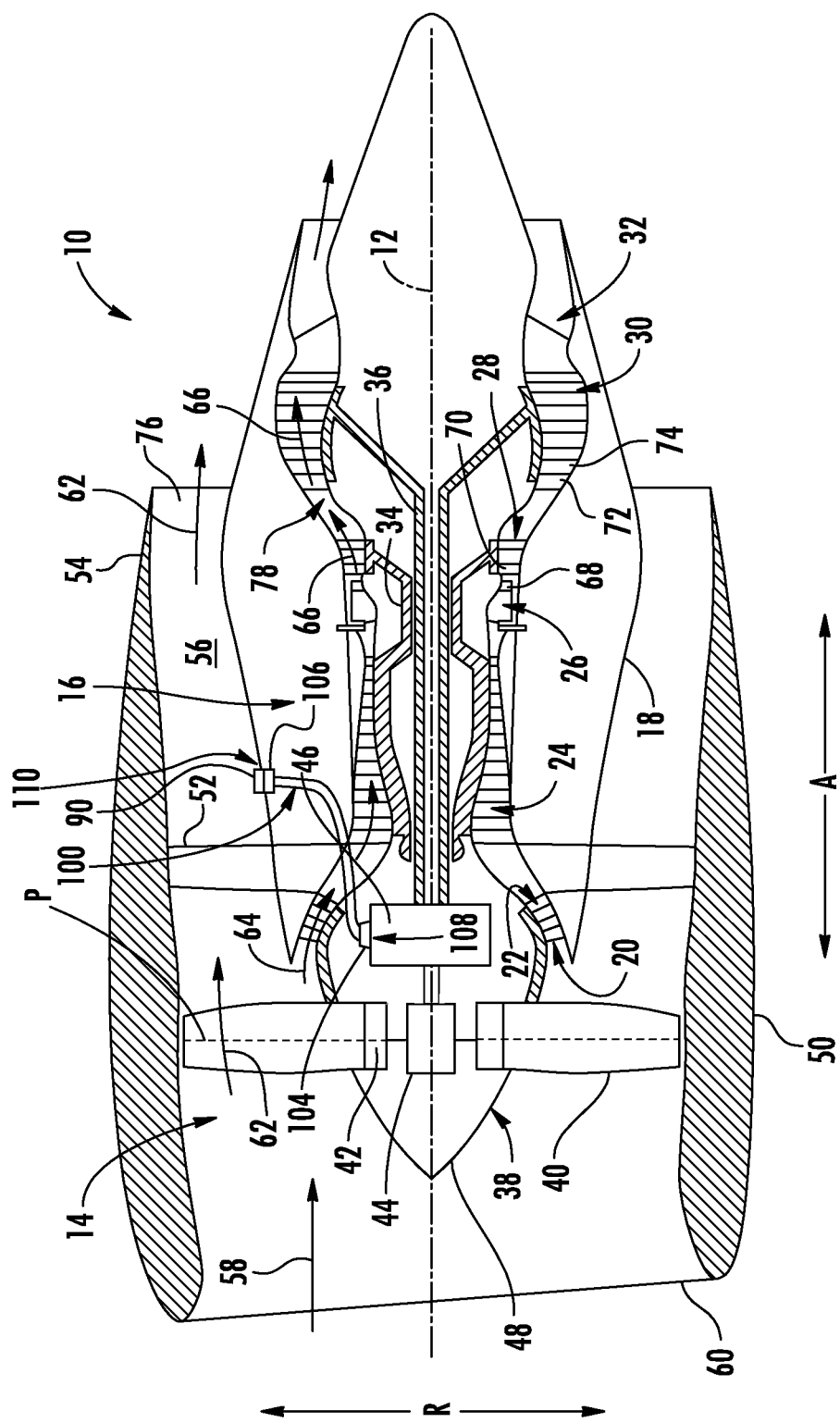
FIG. 1 is a schematic cross-sectional view of an exemplary gas turbine engine according to various embodiments of the present subject matter.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a thermal management system, with forward referring to a position closer to component inlet and aft referring to a position closer to a component exhaust. The terms "upstream" and "downstream" refer to the relative direction with respect to fluid flow in a fluid pathway. For example, "upstream" refers to the direction from which the fluid flows, and "downstream" refers to the direction to which the fluid flows. Furthermore, as used herein, terms of approximation, such as "approximately," "substantially," or "about," refer to being within a ten percent margin of error.

The present disclosure is generally directed to a tube array and a method for additively manufacturing the tube array. The tube array includes an outer wall formed by a plurality of curved segments and defining a primary flow passage. A plurality of divider walls are positioned within the primary flow passage to divide the primary flow passage into a plurality of tubes, each of the plurality of tubes being defined at least in part by one of the plurality of curved segments and two of the plurality of divider walls. Integrally formed inlet and outlet manifolds provide fluid communication between the tube array and an array inlet and outlet.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline or central axis 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustor or combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed and is attached to one or both of a core frame or a fan frame through one or more coupling systems.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated that the exemplary turbofan 10 depicted in FIG. 1 is by way of example only and that in other exemplary embodiments, turbofan 10 may have any other suitable configuration. For example, it should be appreciated that in other exemplary embodiments, turbofan 10 may instead be configured as any other suitable turbine engine, such as a turboprop engine, turbojet engine, internal combustion engine, etc.

Referring still to FIG. 1, turbofan 10 may include one or more tube arrays 100. Tube arrays 100 may be used to transport one or more fluids between two or more locations within turbofan 10. For example, as illustrated in FIG. 1, tube array 100 is configured for recirculating hot oil from a gearbox (e.g., power gear box 46) to an air-cooling-oil heat exchanger 90 to cool the oil. More specifically, heat exchanger 90 is illustrated as being positioned within or fluidly coupled to bypass airflow passage 56 for allowing heat transfer between hot oil passing through heat exchanger 90 and cool air passing through bypass airflow passage 56.

However, it should be appreciated that heat exchanger 90 may be placed at any other suitable location within turbofan 10 and tube array 100 may transport fluids between any other locations within turbofan 10 for any suitable purpose. In addition, although the description below refers to the construction of tube array 100 for use in turbofan 10, it should be appreciated that tube array 100 is used only for the purpose of explaining aspects of the present subject matter. Indeed, aspects of the present subject matter may be applied to form tube arrays or fluid conduits for use in automotive, aviation, maritime, and other industries to assist in fluid transfer.

In general, the exemplary embodiments of tube array 100 described herein may be manufactured or formed using any suitable process. However, in accordance with several aspects of the present subject matter, tube array 100 may be formed using an additive-manufacturing process, such as a 3-D printing process. The use of such a process may allow tube array 100 to be formed integrally, as a single monolithic component, or as any suitable number of sub-components. In particular, the manufacturing process may allow tube array 100 to be integrally formed and include a variety of features not possible when using prior manufacturing methods. For example, the additive manufacturing methods described herein enable the manufacture of tube arrays having any suitable size and shape with multiple internal passageways and various features defined within these fluid passageways which were not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and unique fluid passageways with integral inlet and outlet manifolds. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved performance and reliability.

As described above in reference to FIG. 1, turbofan engine 10 includes tube array 100 for providing fluid communication between a sump of power gear box 46 and an oil cooling heat exchanger 90. In this regard, oil may be circulated through gearbox 46, tube array 100, and heat exchanger 90 to continuously cool and replenish oil within the gearbox 46. Alternatively, tube array 100 may be used to transport fuel throughout engine, e.g., from a fuel storage source to a combustion source. According still other embodiments tube array 100 may be used to provide a flow of cooling air to hot regions of the engine as desired. It should be appreciated that tube array 100 may be used for transmitting fluid between any two locations according to alternative embodiments. The use of tube array 100 as described herein is only one exemplary application and is not intended to limit the scope of the present subject matter.

Notably, routing fluids throughout turbofan engine 10 is often difficult due to the limited space available within turbofan engine 10. For example, conventional piping or conduit has a circular cross section, e.g., to address stress concerns particularly with respect to passing high pressure fluid. However, circular conduit that is large enough to pass the desired flow rates of fluid often cause packaging and installation issued, e.g., constant diameter tubes may not be routed through certain regions of turbofan 10. Multiple smaller tubes may be used to help routing such fluids, but this results in an inefficient use of space, manufacturing difficulties, and increased cost and complexity. Thus, tube array 100 as described herein may be formed to permit such fluid transfer within the tight confines of the turbofan 10 in a cost effective and efficient manner.

Figure 2:
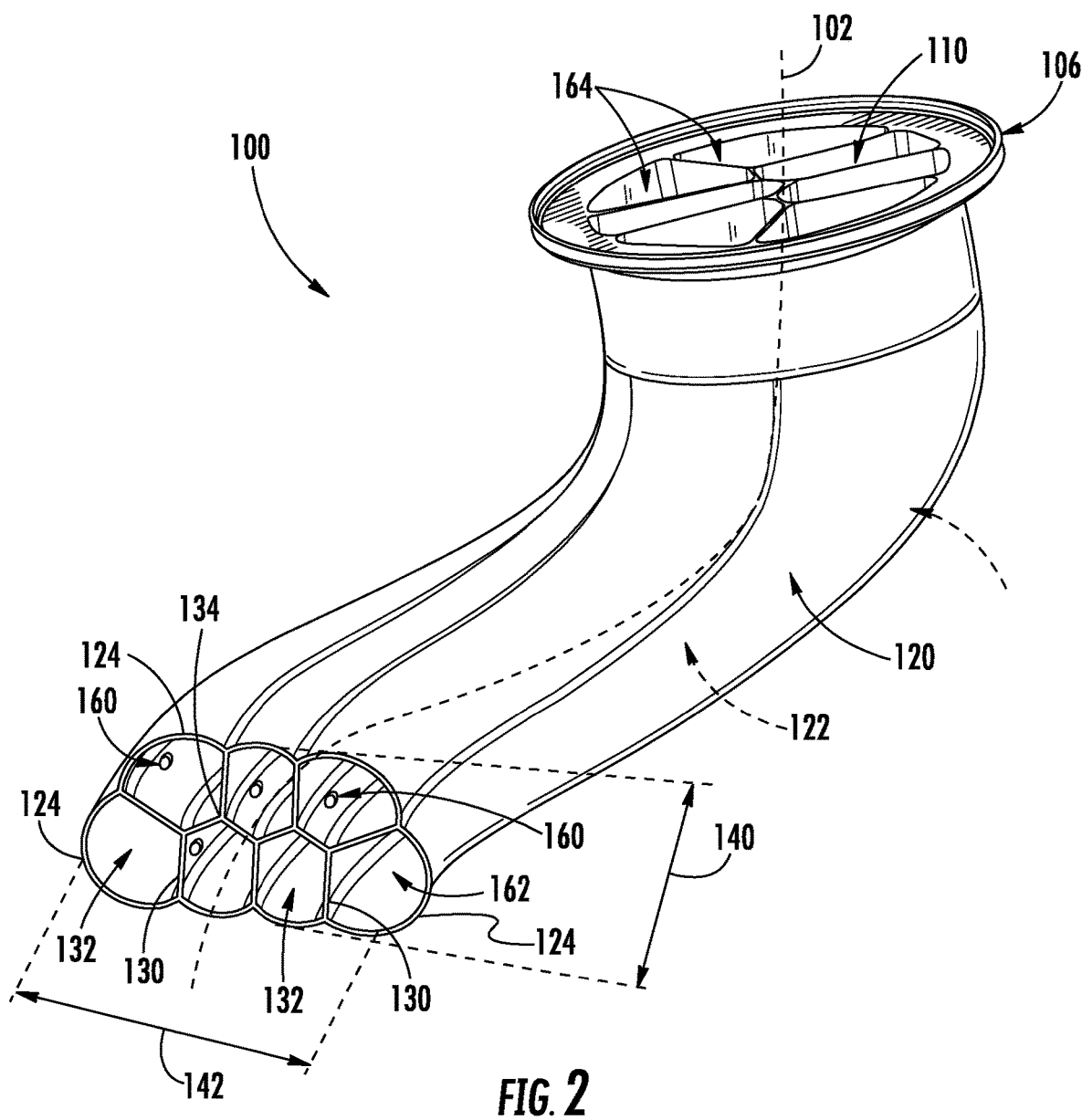
FIG. 2 provides a partial perspective view of an additively manufactured tube array that may be used in the exemplary gas turbine engine of FIG. 1 according to an exemplary embodiment of the present subject matter.

Referring now to FIGS. 2 through 6, tube array 100 will be described according to various exemplary embodiments of the present subject matter. In particular, FIG. 2 illustrates a partial perspective view of tube array 100 according to one embodiment and FIGS. 3 through 6 illustrate cross-sectional views of tube array 100 according to alternative embodiments.

As illustrated, tube array 100 extends along a central axis 102 between an inlet manifold 104 (see FIG. 1) and an outlet manifold 106. In this regard, inlet manifold 104 may define an array inlet 108 and outlet manifold 106 made may define an array outlet 110. Fluid may be drawn into tube array 100 through array inlet 108 before passing through tube array 100 along central axis 102 and out of array outlet 110. As illustrated, central axis 102 may be curved and tube array 100 may define a non-circular cross sectional profile for improved routing through turbofan engine 10.

Referring now specifically the FIGS. 2 through 6, tube array 100 includes an outer wall 120 which defines a primary flow passage 122. More specifically, as illustrated, outer wall 120 is formed by a plurality of curved segments 124 which together define primary flow passage 122, which provides fluid communication between inlet manifold 104 and outlet manifold 106.

In addition, tube array 100 includes a plurality of divider walls 130 that are positioned within primary flow passage 122 to divide primary flow passage 122 into a plurality of passages or tubes 132. In this regard, divider walls 130 extend from outer wall 120 into primary flow passage 122 and form a plurality of junctions 134 with other adjacent divider walls 130. In this manner, divider walls 130 divide primary flow passage 122 into a plurality of distinct flow passages or tubes 132 which may transport the same or different fluids, as described below.

More specifically, according to an exemplary embodiment of the present subject matter, each of the plurality of tubes 132 are defined at least in part by one of the plurality of curved segments 124 and two of the plurality divider walls 130. According still other embodiments, tubes 132 may be defined by more than one of the curved segments 124 and/or more than two of the divider walls 130. Several exemplary configurations of outer wall 120 and divider walls 130 are illustrated in the figures herein. However, it should be appreciated that these configurations are only intended to illustrate exemplary embodiments of the present subject matter and are not intended to limit the scope of the disclosure.

Referring now specifically to FIG. 2, outer wall 120 is shaped to fit within a low-profile region of turbofan 10. In this regard, for example, outer wall 120 may define a height 140 which is less than a width 142, e.g., measured along a direction perpendicular to height 140. According to an exemplary embodiment, height 140 may be less than one half width 142, or smaller. In addition, divider walls 130 are positioned within primary flow passage 122 two divide primary flow passage 122 into seven tubes 132, with a bottom row having four tubes 132 and a top row having three tubes 132. It should be appreciated that any other suitable number and arrangement of tubes 132 may be used to form a cross-sectional profile that may fit within any suitable region of turbofan 10 or between any other components of any machine.

Figure 3:
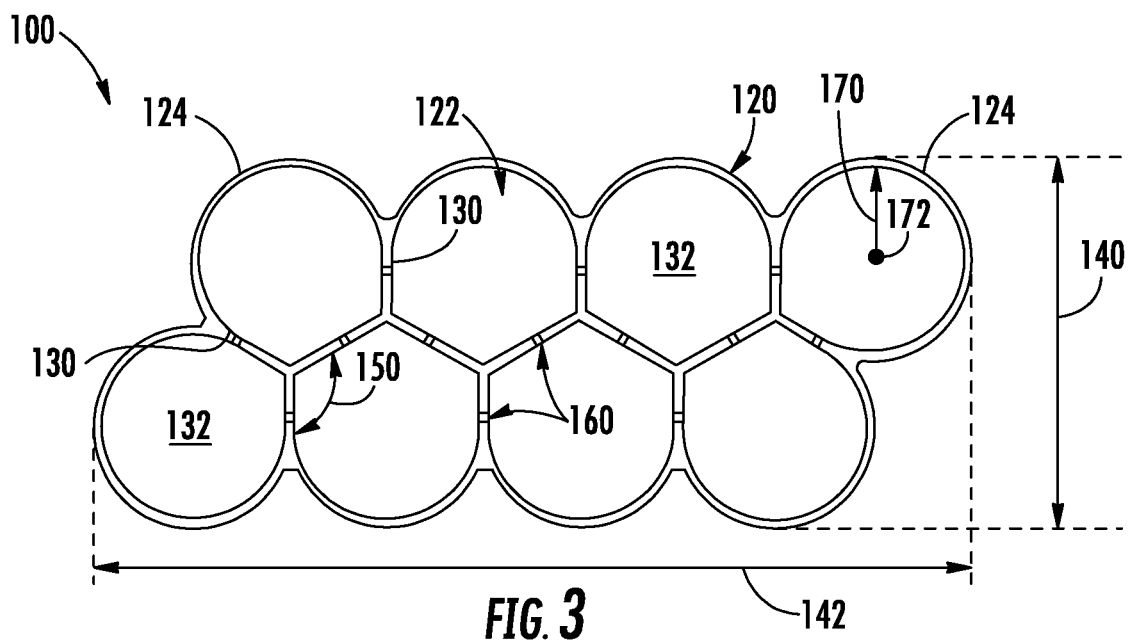
FIG. 3 provides a cross-sectional view of an additively manufactured tube array according to an exemplary embodiment of the present subject matter.
Figure 4:
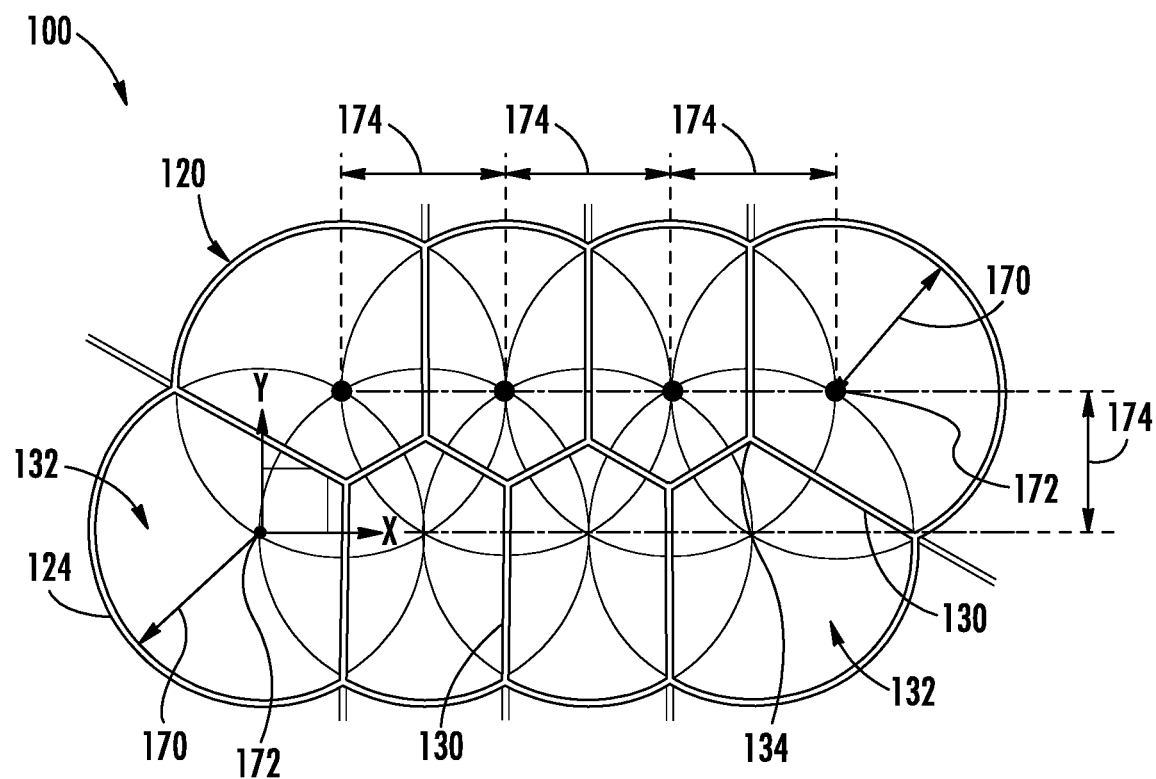
FIG. 4 provides a cross-sectional view of an additively manufactured tube array according to another exemplary embodiment of the present subject matter.

As best shown in FIGS. 3 and 4, adjacent divider walls 130 are joined at junctions 134 such that they define an intersection angle 150 within adjacent divider walls 130. According to an exemplary embodiment, intersection angle 150 is between about 85 and 155 degrees. According to still another embodiment, intersection angle 150 is approximately 120 degrees. Other suitable angles and configurations are possible and within scope of the present subject matter.

Notably, divider walls 130 are illustrated herein as being substantially straight when viewed within a plane perpendicular to central axis 102. Moreover, divider walls 130 maintain their orientation along a length of tube array 100, e.g., such that a cross sectional area of each tube 132 remains substantially constant along the length of tube array 100. However, it should be appreciated that divider walls 130 may vary along the length of tube array 100, may have different geometries, or may define passageways or ports for permitting a fluid to flow between tubes 132.

Although divider walls 130 are illustrated as being straight walls formed into a lattice structure to define a plurality of tubes 132, it should be appreciated that divider walls 130 could instead be curvilinear, serpentine, helical, sinusoidal, or any other suitable shape. In addition, divider walls 130 may be formed in any suitable size, number, spacing, shape, and orientation as needed depending on the application and the type of fluid. These various configurations are enabled by the additive manufacturing processes disclosed herein and are considered to be within the scope of the present subject matter.

According to the illustrated embodiment shown in FIG. 2, divider walls 130 may have a substantially uniform thickness. However, according to alternative embodiments, localized thinned regions may be defined in divider walls 130, e.g., to reduce weight, to properly distribute stress concentrations, or for any other suitable purpose. In addition, divider walls 132 may define one or more holes, apertures, slots, or perforations 160 through which fluid may pass between adjacent tubes 132. In this manner, fluid pressures and temperatures within tube array 100 may be equalized, fluids may be thoroughly mixed, and other desirable flow characteristics may be achieved.

However, it should be appreciated that tubes 132 may instead be defined by solid divider walls 130. Notably, such a construction may permit the flow of multiple segregated fluids within tube array 100. In such an embodiment, inlet manifold 104 may be in fluid communication with two different fluid supply sources and a pass fluid from those sources through dedicated tubes 132 defined through tube array 100. Moreover, it should be appreciated that according to alternative embodiments, tube array 100 may include multiple inlet manifolds 104 and/or outlet manifolds 106 for controlling the flow of fluid as needed.

Notably, each tube 132 may define a tube inlet 162 and a tube outlet 164 which are separated along central axis 102. Inlet manifold 104 may be in fluid communication with tube inlets 162 and tube outlets 164 may be in fluid communication with outlet manifold 106. In this manner, inlet manifold 104 and outlet manifold 106 are generally configured for dividing and merging the flow of fluid into and out of tube array 100, respectively.

Although the exemplary embodiment illustrates a tube array 100 having a single tube bundle and a single central axis 102, it should be appreciated that tube array 100 may be split into two or more tube bundles according to alternative embodiments. For example, tube array 100 may extend from a single inlet manifold 104 to a junction where the central axis 102 is split into two diverging central axes that are routed in different directions, e.g., a "T-split" style tube array 100. Each tube bundle may be routed to separate locations within turbofan 10 or may merge downstream and terminate in a single outlet manifold 106. Other configurations of tube array 100 are possible and within the scope of the present subject matter.

Referring now generally to FIGS. 3 and 4, curved segments 124 may have any suitable shape for improving the performance of tube array 100 in directing fluid flow. According to an exemplary embodiment, it may be desirable to have curved segments 124 with a fixed radius 170 as defined from a center 172 of an imaginary circle defined in part by curved segment 124. In this regard, each curved segment 124 forms part of a circle, e.g. as shown for example in the schematic of FIG. 4. According still another embodiment, curved segments 124 may have a sinusoidal profile, a wavy profile, a zigzag profile, or any other suitable shape.

In addition to varying the size or shape of the outer wall 122 and curved segments 124, the spacing of tubes 132 may be adjusted to achieve the desired fluid flow. For example, adjacent tubes 132 may define a center spacing distance 174 as measured between centers 172 of those adjacent tubes 132. According to an exemplary embodiment, for example as illustrated in FIG. 4, the center spacing distance 174 is greater than or equal to the fixed radius 170 of curved segments 124. Notably, according to the illustrated embodiment, curved segments 124 all have a fixed radius 170 of the same or a similar magnitude. However, it should be appreciated that according to alternative embodiments, outer wall 122 may be defined such that curved segments 124 each have a different shape or profile.

Figure 5:
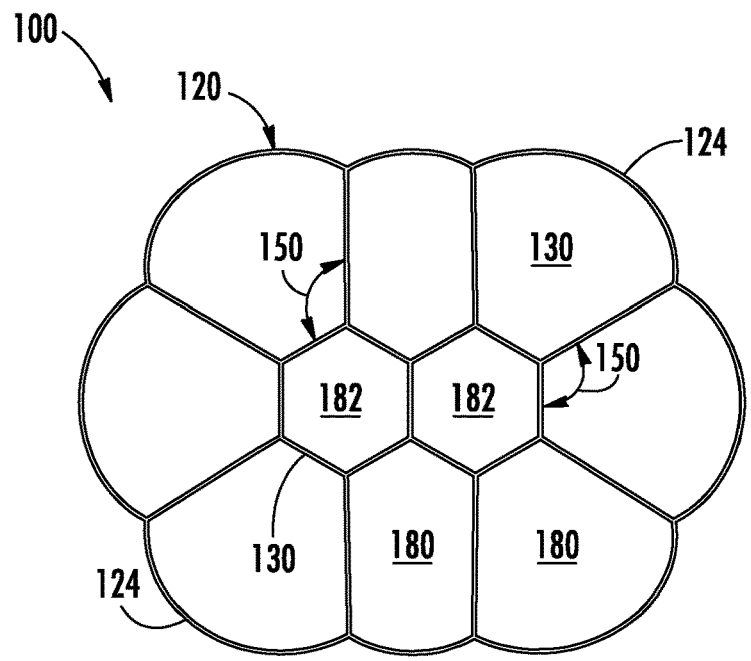
FIG. 5 provides a cross-sectional view of an additively manufactured tube array according to another exemplary embodiment of the present subject matter.

According to an exemplary embodiment, tube array 100 may further include additional "internal" tubes, e.g., tubes not defined in part by outer wall 120. In this regard, referring now to FIGS. 5 and 6, tubes 132 formed as described above, i.e., from at least one curved segment 124 and at least two divider walls 130, may be referred to as perimeter tubes 180. Notably, however, tube array 100 further includes inner tubes 182 that are defined entirely by divider walls 130. In this regard, for example, FIG. 5 illustrates two inner tubes 182, each being defined by six divider walls 130. Thus inner tubes 182 have a hexagonal cross-sectional profile or structure. It should be appreciated that according to alternative embodiments, as few as three divider walls 130 may be used to define inner tubes 182, e.g., such that they have a triangular cross section. Any suitable number and size of perimeter tubes 180 and inner tubes 182 may be used to form tube array 100 having a suitable cross sectional profile for passing through tight areas within turbofan 10.

Figure 6:
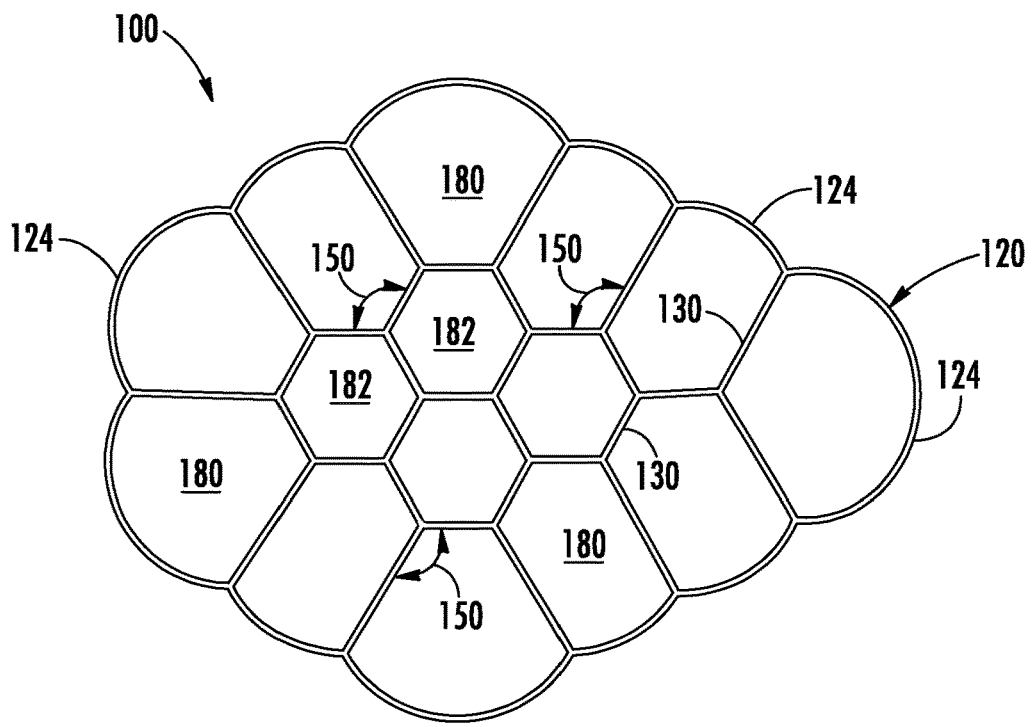
FIG. 6 provides a cross-sectional view of an additively manufactured tube array according to another exemplary embodiment of the present subject matter.

According to exemplary embodiments of the present subject matter, it may be desirable that the cross-sectional areas of tubes 132 (whether perimeter tubes 180 or inner tubes 182) have the same cross-sectional area. However, as illustrated in FIGS. 5 and 6, perimeter tubes 180 all have substantially the same cross-sectional area while inner tubes 182 all have a smaller cross sectional area than perimeter tubes 180. However, it should be appreciated that curved segments 124 and divider walls 130 may be positioned, oriented, and sized to form tubes 132 having any suitable cross-sectional area.

Figure 7:
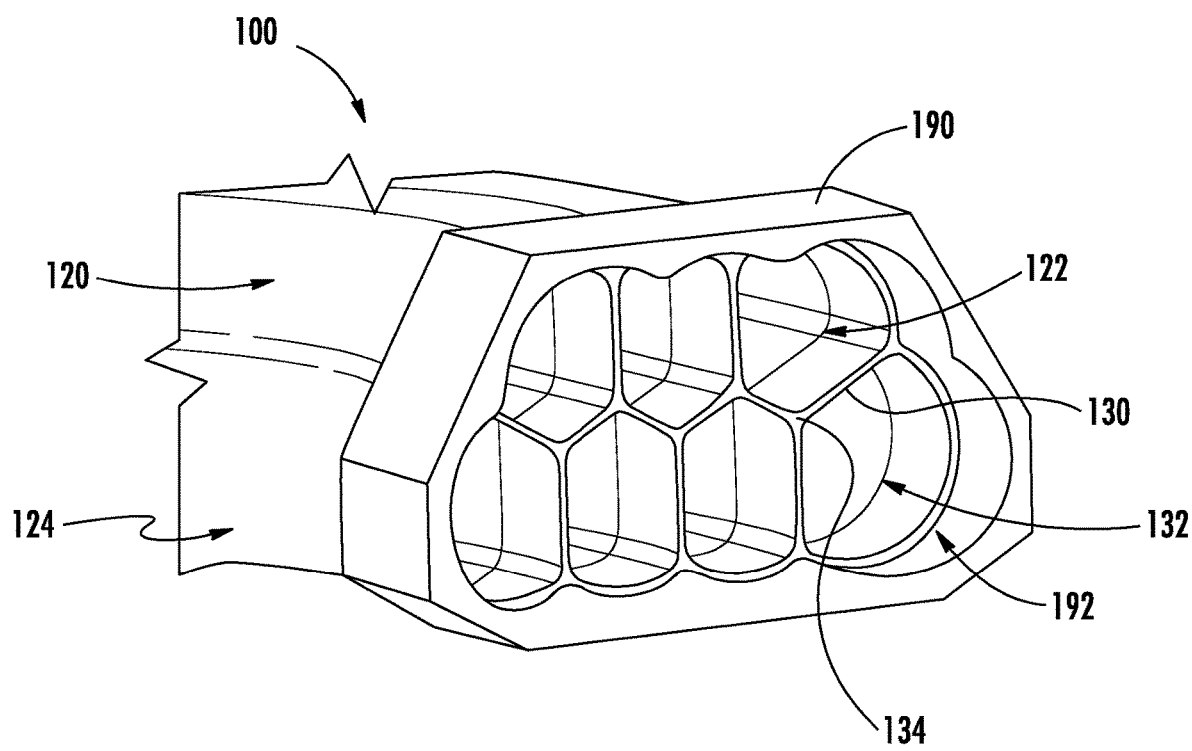
FIG. 7 provides a perspective view of an additively manufactured tube array and a coupling band according to another exemplary embodiment of the present subject matter.

Notably, it may sometimes be desirable to join separate sections of tube arrays 100, e.g., due to manufacturing size limitations of DMLM machines. Thus, as illustrated in FIG. 7, tube arrays 100 may generally be joined using a coupling band 190. Coupling band 190 is generally a sleeve positioned around the ends of adjacent tube arrays 100 and used as a connecting junction. More specifically, for example, adjacent tube arrays 100 may be slid or inserted into the coupling band 190 and the joint may be solidified using braze, solder, welding, diffusion bonding, or another sealing or joining method. Moreover, coupling band 190 may define an inner surface 192 that is profiled to closely match the profile of outer wall 120. However, according to alternative embodiments, inner surface 192 may simply define a rough outline of outer wall, e.g., with substantially straight wall segments, and the gaps may be filled in with the joining material, e.g., braze or solder. Other tube joining mechanisms and methods are possible and within the scope of the present subject matter.

It should be appreciated that "fluid" may be used herein to refer to any gas, liquid, or some combination thereof. In addition, although tube array 100 is described as transporting a single fluid, it should be appreciated that each tube 132 of tube array 100 may be fluidly coupled to a separate fluid supply source. In this regard, some tubes 132 may pass a first fluid while other tubes 132 may pass a second fluid. Thus, the present approach is not limited by the types of fluids that are used, and may be used for any suitable types of liquid and gaseous fluids, such as fuel, hydraulic fluid, combustion gas, refrigerant, refrigerant mixtures, dielectric fluid for cooling avionics or other aircraft electronic systems, water, water-based compounds, water mixed with antifreeze additives (e.g., alcohol or glycol compounds), oil, air, and any other fluid or fluid blends.

It should be appreciated that tube array 100 is described herein only for the purpose of explaining aspects of the present subject matter. For example, tube array 100 will be used herein to describe exemplary configurations, constructions, and methods of manufacturing tube array 100. It should be appreciated that the additive manufacturing techniques discussed herein may be used to manufacture other tube arrays of fluid conduits having multiple passageways for use in any suitable device, for any suitable purpose, and in any suitable industry. Thus, the exemplary components and methods described herein are used only to illustrate exemplary aspects of the present subject matter and are not intended to limit the scope of the present disclosure in any manner.

Now that the construction and configuration of tube array 100 according to an exemplary embodiment of the present subject matter has been presented, an exemplary method 200 for forming a tube array according to an exemplary embodiment of the present subject matter is provided. Method 200 can be used by a manufacturer to form tube array 100, or any other suitable tube array or fluid conduit. It should be appreciated that the exemplary method 200 is discussed herein only to describe exemplary aspects of the present subject matter, and is not intended to be limiting.

Figure 8:
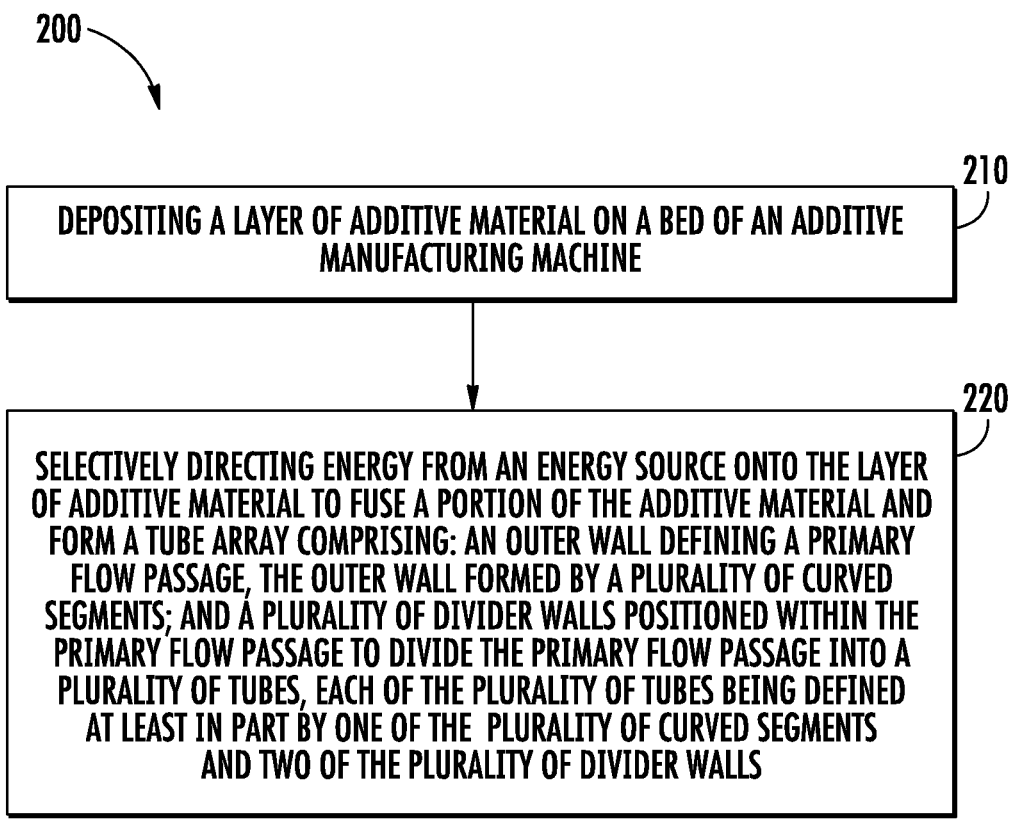
FIG. 8 is a method of manufacturing a tube array according to an exemplary embodiment of the present subject matter.

Referring now to FIG. 8, method 200 includes, at step 210, depositing a layer of additive material on a bed of an additive manufacturing machine. Method 200 further includes, at step 220, selectively directing energy from an energy source onto the layer of additive material to fuse a portion of the additive material and form a tube array. For example, using the example from above, tube array 100 may be formed for transmitting fluids between two or more locations.

The additively manufactured tube array may include an outer wall defining a primary flow passage. The outer wall may be formed by a plurality of curved segments, and each segment may share a fixed radius or may have a different radius. A plurality of divider walls may be positioned within the primary flow passage to divide the primary flow passage into a plurality of tubes. Each of the plurality of tubes may be defined at least in part by one of the plurality of curved segments and two of the plurality of divider walls.

The curved segments of the outer wall and the divider walls may be sized, positioned, and oriented in any suitable manner for achieving the desired flow characteristics through the tube array. For example, the center-to-center spacing distance between adjacent tubes may be fixed or variable, and the center spacing distance being greater than or equal to the fixed radius. According to still other embodiments, divider walls may be formed to define a localized thinned region or one or more perforations providing fluid communication between adjacent tubes. Other features may be defined in outer wall or divider walls during the additive manufacturing process to improve the functionality of the tube array.

Each of the plurality of tubes may extend between a tube inlet and a tube outlet along a central axis. According to exemplary embodiments, method 200 may further include using the additive manufacturing methods described herein to form an inlet manifold that provides fluid communication between an array inlet and the tube inlets and an outlet manifold that provides fluid communication between the tube outlets and an array outlet. Notably, according to an exemplary embodiment, the outer wall, the plurality of divider walls, the inlet manifold, and the outlet manifold are integrally formed as a single monolithic component.

FIG. 8 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using tube array 100 as an example, it should be appreciated that these methods may be applied to manufacture any suitable tube array or fluid conduit.

A tube array and a method for manufacturing that tube array are described above. Notably, tube array 100 may generally include performance-enhancing geometries and flow passages whose practical implementations are facilitated by an additive manufacturing process, as described below. For example, using the additive manufacturing methods described herein, the tube array may include an outer wall including a plurality of tubes for efficiently transporting fluids through tight passageways within a gas turbine engine. In addition, divider walls which are additively manufactured within the tube array and not accessible through the outer wall may be formed to have features that ensure the structural rigidity of the tube array while minimizing excessive material usage and ensuring the proper mixing of fluid between tubes. In addition, the additive manufacturing techniques described herein enable the formation of a tube array with integral inlet and outlet manifolds and tubes designed to reduce flow resistance of the tube array. These features may be introduced during the design of the tube array, such that they may be easily integrated into the tube array during the build process at little or no additional cost. Moreover, the entire tube array, including the outer wall, the divider walls, the inlet and outlet manifolds, and all other features can be formed integrally as a single monolithic component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additively manufactured tube array comprising:
an outer wall defining a primary flow passage, the outer wall formed by a plurality of curved segments, each of the plurality of curved segments defining a fixed radius and a length, wherein the length of at least two of the plurality of curved segments is different; and
a plurality of divider walls positioned within the primary flow passage to divide the primary flow passage into a plurality of tubes, each of the plurality of tubes being defined at least in part by one of the plurality of curved segments and two of the plurality of divider walls, and wherein each of the plurality of curved segments partially defines one of the plurality of tubes.

2. The additively manufactured tube array of claim 1, wherein the plurality of tubes are perimeter tubes, the additively manufactured tube array further comprising:
one or more inner tubes defined by three or more of the plurality of divider walls.

3. The additively manufactured tube array of claim 2, wherein each of the inner tubes are defined by six of the plurality of divider walls.

4. The additively manufactured tube array of claim 3, wherein each of the inner tubes defines a hexagonal cross section.

5. The additively manufactured tube array of claim 1, wherein each of the plurality of divider walls defines an intersection angle with an adjacent divider wall, the intersection angle being between about 85 degrees and 155 degrees.

6. The additively manufactured tube array of claim 5, wherein the intersection angle is approximately 120 degrees.

7. The additively manufactured tube array of claim 1, wherein the plurality of divider walls are substantially straight within a plane perpendicular to a central axis.

8. The additively manufactured tube array of claim 1, wherein the plurality of divider walls have a substantially uniform thickness.

9. The additively manufactured tube array of claim 1, wherein the plurality of divider walls define a localized thinned region.

10. The additively manufactured tube array of claim 1, wherein the plurality of divider walls define one or more perforations providing fluid communication between adjacent tubes.

11. The additively manufactured tube array of claim 1, wherein a center of each of the plurality of tubes is spaced apart from the center of adjacent tubes by a center spacing distance, the center spacing distance being greater than or equal to the fixed radius.

12. The additively manufactured tube array of claim 1, wherein each of the plurality of tubes extends between a tube inlet and a tube outlet along a central axis, the tube array further comprising:

an inlet manifold providing fluid communication between an array inlet and the tube inlets; and an outlet manifold providing fluid communication between the tube outlets and an array outlet.

13. The additively manufactured tube array of claim 12, wherein the central axis is curved between the array inlet and the array outlet.

14. The additively manufactured tube array of claim 12, wherein the inlet manifold, the outer wall, the plurality of divider walls, and the outlet manifold are integrally formed as a single monolithic component.

15. The additively manufactured tube array of claim 1, wherein the tube array comprises a plurality of layers formed by:

depositing a layer of additive material on a bed of an additive manufacturing machine; and selectively directing energy from an energy source onto the layer of additive material to fuse a portion of the additive material.

16. The additively manufactured tube array of claim 1, wherein the outer wall defines a height and a width, the width being greater than the height.

17. The additively manufactured tube array of claim 16, wherein the height is less than one half the width.

18. The additively manufactured tube array of claim 1, wherein at least one of the plurality of divider walls is non-linear within a plane perpendicular to a central axis.

* * * * *